March 7, 1950 — O. WITTEL — 2,500,050
CAMERA LENS ATTACHING AND CLAMPING MECHANISM
Filed Jan. 7, 1948
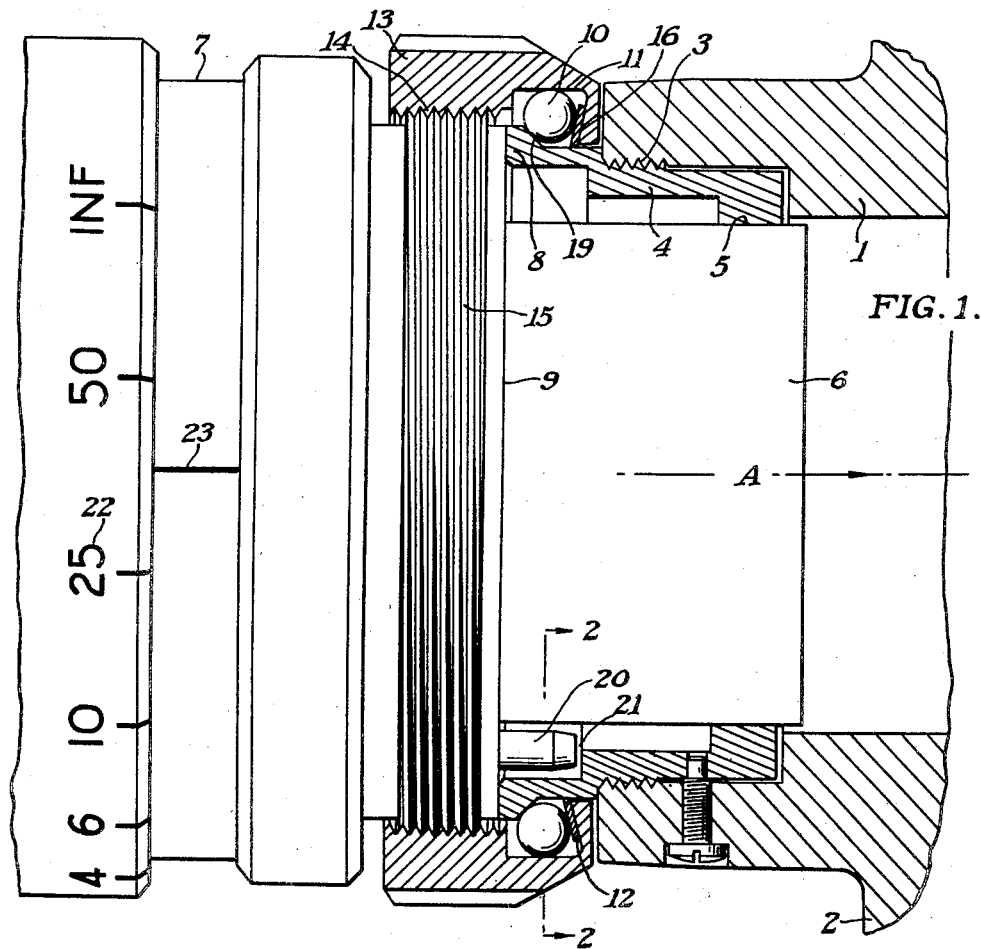
FIG. 1.
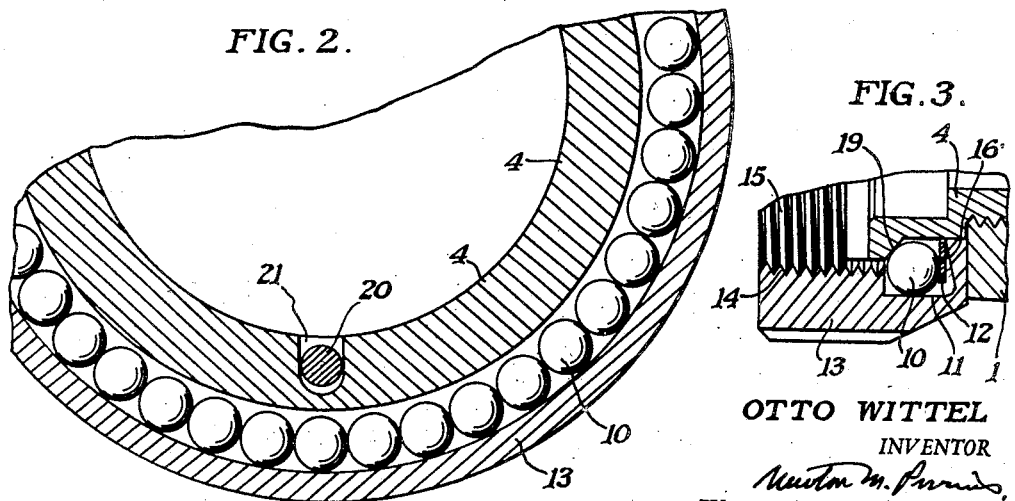
FIG. 2.
FIG. 3.
OTTO WITTEL
INVENTOR
BY
ATTORNEYS Patented Mar. 7, 1950

2,500,050

UNITED STATES PATENT OFFICE 2,500,050

CAMERA LENS ATTACHING AND CLAMPING MECHANISM

Otto Wittel, Rochester, N. Y., assignor to Eastman Kodak Company, Rochester, N. Y., a corporation of New Jersey Application January 7, 1948, Serial No. 933

4 Claims. (Cl. 88—57)

This invention relates to photography and more particularly to a mechanism for attaching and clamping an objective to a support. One object of my invention is to provide a lens-attaching mechanism which will firmly clamp a lens mount in a fixed position on a support. Another object of my invention is to provide a lens-attaching and clamping mechanism which will tend to prevent accidental removal of the lens from an accurate operative position. Another object of my invention is to provide a device of the class described which is simple in construction, which is easy to operate, and comparatively simple to manufacture. Still, a further object of my invention is to provide a lens-attaching mechanism in which there is little, if any, chance that a torque applied to the lens barrel will be transmitted to the mount, and other objects will appear from the following specification; the novel features being particularly pointed out in the claims at the end thereof.

At the present time there are many cameras on the market designed to take any one of a series of different objectives carried in lens mounts which are interchangeable on the supports to which the lens mounts may be attached. Usually, the attaching means consists of a simple threaded connection, but there are a number of disadvantages in such a threaded connection because it is usually difficult, with such a threaded mount, to keep the objective with the lens mount properly seated on the locating pad of its support while using the camera. I have found that most of the difficulties occur because of a torque applied to the lens mount, as, for instance, in setting the diaphragm of the lens mount or setting the objective at a given focal distance and that this torque is applied to the lens mount as a whole. Even though lens mounts are usually located by a pin and slot, the slight movement permitted by this pin and slot permits repeated movements of the lens mount to slightly unscrew the threaded connection without the operator knowing that this occurs. The resulting pictures, of course, become more and more out of focus as the lens is unscrewed more and more, and spoiled pictures result, even if the lens is not unscrewed far enough to be released from the camera.

This action is particularly noticed where the threads, connecting the lens mount and its support, are multiple threads, such as double, triple, or quadruple threads, as are frequently used in such lens mounts. The multiple threads have the advantage of requiring less arc of movement to tighten the lens mounts on the supports, and they have the disadvantage that the steeper the thread the more difficult it is to tighten the lens on the mount. It is customary in removable objectives to provide one or more knurled rings for turning parts of the mount as for adjusting focus or for adjusting a diaphragm; a typical example of such a lens mount being shown in my U. S. Patent 2,180,027, granted November 14, 1939. In such lens mounts there are frequently pins projecting into slots which limit the turning movement of given rings and, of course, when the ring is turned and reaches the end of the slot, a very material torque may be applied to the lens mount as a whole. Thus, the operator may unconsciously slightly unscrew his lens every time a knurled ring is turned to one extent of its movement in one direction.

My invention is particularly designed to overcome these difficulties. By providing a clamping ring which turns freely on the support, and by limiting the friction between the ring and the support, I have been able to provide a lens-clamping device without the use of locks or latches of any kind which overcomes most of the objections mentioned above and which will attach and clamp an objective in position, both easily and firmly, to such an extent that the objective will remain properly seated until removed.

Coming now to the drawings wherein like reference characters denote like parts throughout:

Fig. 1 is an enlarged fragmentary section, part in elevation, showing a typical lens mount attached to a typical support with a latching and clamping mechanism constructed in accordance with and embodying a preferred form of my invention;

Fig. 2 is an enlarged fragmentary section taken on line 2—2 of Fig. 1; and

Fig. 3 is a fragmentary sectional view of the support without an objective in place and with the spring washer in its normal unflexed position.

This invention consists broadly in providing a support with a lens-attaching and clamping mechanism which consists of a threaded ring mounted to turn freely on the support; this threaded ring being carried on the support which also includes a locating pad on which the lens mount is seated. Most of the friction between the locking ring and the support is eliminated, or at least reduced to such an extent that friction between the threaded area of the ring and a mating threaded area of the objective will be sufficient to cause the lens mount and ring to turn together insofar as this turning movement can take place, because of the locating means which may be a pin and slot.

More specifically, in the present instance in Fig. 1 I have illustrated a typical support 1 which may be a tubular support, or it may form a front tubular extension of a camera wall 2. Into the tubular member 1 there is threaded at 3 an annular member 4. This member is provided with a cylindrical portion 5 of a size to telescopically fit the cylindrical portion 6 of a lens mount 7. Thus, the lens mount and tubular support are held in axial alignment by these two telescoping portions. The cylindrical member 4 is provided with a locating pad 8 which, in this instance, is a carefully turned surface on the end of the tubular member against which a shoulder 9 on the lens mount fits; this shoulder 9 serving as a locating pad for the lens mount. When the pads 8 and 9 lie against each other, as in Fig. 1, the lens mount 7 is in the proper position with respect to the tubular support 1 to provide an image accurately in the focal plane of a camera, as is well known. The ring member 4 is provided with a portion of a ball race in the form of an inclined wall 19. A plurality of balls 10 lie in this ball race and the ball race includes walls 11 and 12 formed in a locking ring 13. This locking ring is provided with a threaded member 14 which may engage mating threads 15 on the lens mount 7.

The locking ring is mounted to turn freely on the balls of the ball race and I prefer to provide a spring washer 16 against one wall (here shown as wall 12 of the ball race); this washer normally lying in a plane but being movable from this plane when flexed by pressure between the balls 10 and the walls of the race, as indicated in Fig. 1. Fig. 3 shows the spring washer 16 unflexed and tending to hold the locking ring 13 against support 1 in a normal position of rest.

In attaching the lens mount to the camera, the tubular portion 6 is inserted in the tubular mount 1 along the axis "A" and when the locating pads 8 and 9 are brought opposite to each other and seated, one upon the other, the lens mount is in an operative position. To reach this position, the threaded ring 13 is turned so that the threads 14 may draw the mating threads 15 inwardly until the locating pads are in engagement. As the ring 13 is gradually tightened, pressure is applied to the spring washer 16, flexing the washer so as to produce a smooth gradual tightening movement, and so that it will not be necessary to apply so much pressure to the balls to lock the ring against the support 1. The ring may always move relative to the support 1 because the friction has been limited to such an extent that the friction between the threads 14 and 15 will move the ring 13 with the lens mount 7 together as a single element; this movement being permitted by the balls 10.

As is customary, the lens mount 7 is provided with a pin 20 which enters a slot 21 in the ring member 4; the purpose of this being to locate the lens with a focusing scale, for instance, 22, or a pointer 23, in a given position with respect to the support or camera body. The pin 20 may inaccurately fit the slot 21 and this is particularly true where the objectives may be made by various different manufacturers. Accordingly, some slight play is permitted between the pin and slot and in constantly using an objective and applying a torque to it, each time the torque is applied in an unscrewing direction, without the ring 13 being movable, the threaded connection would permit the parts to turn only a small angle but nevertheless enough, particularly when turned a large number of times to move the locating pad 9 from the locating pad 8. With my improved construction since any oscillatory movement of the lens mount will be immediately transmitted to the ring 13, which may turn on the balls 10 without altering its position axially with respect to the support 1, such movement of the lens mount does not dislodge the locating pads, nor will not permit the objective to become accidentally unscrewed.

In detaching the lens mount 7 from the support 1, the ring 13 is turned in a direction to release the mating threads 14 and 15 and the lens may be slid away from its support. When the lens is released, the spring washer 16 will move into its normal plane position and it will serve to prevent the ring 13 from rattling or turning too freely on the support 1, as in Fig. 3.

When placing a lens mount on the support, as soon as the balls engage the spring washer 16 and it starts to flex, it applies a light load which tends to prevent undue stress being suddenly applied to the locating pads 8 and 9. These pads, of course, are very accurately finished and it is desirable to provide a means for attaching a lens which will not mar or otherwise harm the accuracy of these contacting surfaces. The spring washer 16 also gives the operator some latitude in the degree of torque which must be applied with the ring 13 to firmly hold the lens mount 7 in place.

While not so often used, my improved lens mount is useful where the lens does not have a locating pin 20 to locate the lens mount on the support by entering a notch 21 in the support 1. The lens mount locating pad 9 may engage the locating pad 8 of the support, and may be turnable thereon. Here, again, reducing friction between the locking ring 13 to a value below that between the threads 14 and 15 permits the lens mount to be turned with pads 8 and 9 in contact and without the threads 14 and 15 loosening because the locking ring 13, turning on balls 10, turns with the lens mount.

Having now described my invention what I desire to secure by Letters Patent of the United States and what I claim is:

1. Attaching means for holding a threaded lens mount including a locating pad and a threaded sleeve to a tubular support comprising a support, a locating pad on the support, telescoping sleeves on the lens mount and support for axially positioning the lens mount on the support, a locking ring mounted on the support having a thread mating with the threaded lens mount, and a plurality of friction reducing means included in the mount and engaging the locking ring for limiting the friction between the ring and the mount to a value below the friction between the threaded lens mount and its mating thread on the ring to prevent the threads from unscrewing by a torque applied to the lens mount.

2. Attaching means for holding a threaded lens mount including a locating pad and a threaded sleeve to a tubular support comprising a support, a locating pad on the support, telescoping sleeves on the lens mount and support for axially positioning the lens mount on the support, a locking ring mounted on the support having a thread mating with the threaded lens mount, and means included in the mount and engaging the locking ring for limiting the friction between the ring and the mount to a value below the friction between the threaded lens mount and its mating thread on the ring to prevent the threads from unscrewing by a torque applied to the lens mount, said means including a ball race having walls carried by the support and the locking ring, and a plurality of balls carried by the ball race.

3. Attaching means for holding a threaded lens mount including a locating pad and a threaded sleeve to a tubular support comprising a support, a locating pad on the support, telescoping sleeves on the lens mount and support for axially positioning the lens mount on the support, a locking ring mounted on the support having a thread mating with the threaded lens mount, and means included in the mount and engaging the locking ring for limiting the friction between the ring and the mount to a value below the friction between the threaded lens mount and its mating thread on the ring to prevent the threads from unscrewing by a torque applied to the lens mount, said means including a ball race having walls carried by the support and the locking ring, and a plurality of balls carried by the ball race, and a spring lying between the balls and one race tending to flex as the locking ring is turned to hold the lens mount on the support.

4. Attaching means for holding a threaded lens mount including a locating pad and a threaded sleeve to a tubular support as defined in claim 1, characterized by the means included in the mount and engaging the locking ring for limiting the friction between the ring and mount including a spring holding the locking ring against the support when in an inoperative position and when a lens mount is not attached to the support.

OTTO WITTEL.

REFERENCES CITED

The following references are of record in the file of this patent:

UNITED STATES PATENTS

| Number | Name | Date |
|---|---|---|
| 1,734,438 | Koehler | Nov. 5, 1929 |
| 1,848,402 | Wollensak | Mar. 8, 1932 |
| 2,172,338 | Mihalyi | Sept. 5, 1939 |
| 2,180,027 | Wittel | Nov. 14, 1939 |
| 2,279,476 | Mihalyi | Apr. 14, 1942 |
| 2,287,468 | Cisski | June 23, 1942 |
| 2,293,592 | Cisski | Aug. 18, 1942 |